US011807581B2

(12) United States Patent
Agarwal et al.

(10) Patent No.: US 11,807,581 B2
(45) Date of Patent: Nov. 7, 2023

(54) ULTRA-HIGH TEMPERATURE CARBIDE FOAMS AND METHODS OF FABRICATING THE SAME

(71) Applicants: Arvind Agarwal, Miami, FL (US); Ambreen Nisar, Miami, FL (US); Tony Thomas, Miami, FL (US); Kazue Orikasa, Miami, FL (US); Benjamin Peter Boesl, Miami, FL (US)

(72) Inventors: Arvind Agarwal, Miami, FL (US); Ambreen Nisar, Miami, FL (US); Tony Thomas, Miami, FL (US); Kazue Orikasa, Miami, FL (US); Benjamin Peter Boesl, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 17/932,819

(22) Filed: Sep. 16, 2022

(65) Prior Publication Data
US 2023/0183139 A1  Jun. 15, 2023

Related U.S. Application Data

(63) Continuation of application No. 17/457,778, filed on Dec. 6, 2021, now Pat. No. 11,472,746.

(51) Int. Cl.
C04B 35/56 (2006.01)
C04B 35/626 (2006.01)
(Continued)

(52) U.S. Cl.
CPC ...... *C04B 35/5622* (2013.01); *C04B 35/5607* (2013.01); *C04B 35/6263* (2013.01); *C04B 35/6264* (2013.01); *C04B 35/62655* (2013.01);
*C04B 35/63424* (2013.01); *C04B 38/0038* (2013.01); *C04B 38/0054* (2013.01);
(Continued)

(58) Field of Classification Search
CPC ............ C04B 35/5622; C04B 35/5607; C04B 38/0038; C04B 38/0054; C04B 2235/3839
See application file for complete search history.

(56) References Cited

U.S. PATENT DOCUMENTS 4,559,244 A    12/1985 Kasprzyk et al.
6,478,994 B1 * 11/2002 Sneddon ............ B01D 67/0067
                                                                 264/43
(Continued)

OTHER PUBLICATIONS

Rouquerol et al. Recommendations for the Characterization of Porous Solids. Pure & Appl. Chern., vol. 66, No. 8, pp. 1739-1758, 1994.*
(Continued)

*Primary Examiner* — Noah S Wiese
(74) *Attorney, Agent, or Firm* — Saliwanchik, Lloyd & Eisenschenk

(57) ABSTRACT

Ultra-high temperature carbide (UHTC) foams and methods of fabricating and using the same are provided. The UHTC foams are produced in a three-step process, including UHTC slurry preparation, freeze-drying, and spark plasma sintering (SPS). The fabrication methods allow for the production of any kind of single- or multi-component UHTC foam, while also providing flexibility in the shape and size of the UHTC foams to produce near-net-shape components.

16 Claims, 14 Drawing Sheets

(51) Int. Cl.
    *C04B 35/634*    (2006.01)
    *C04B 38/00*    (2006.01)
    *B28B 1/14*    (2006.01)

(52) U.S. Cl.
    CPC ......... *B28B 1/14* (2013.01); *C04B 2235/3839* (2013.01); *C04B 2235/606* (2013.01); *C04B 2235/6021* (2013.01); *C04B 2235/6567* (2013.01); *C04B 2235/666* (2013.01); *C04B 2235/9607* (2013.01)

(56) References Cited

U.S. PATENT DOCUMENTS

| | | | |
|---|---|---|---|
| 10,781,142 | B2 | 9/2020 | Li et al. |
| 2008/0159899 | A1* | 7/2008 | Neirinck ............... C04B 35/486 419/2 |
| 2011/0117338 | A1 | 5/2011 | Poquette et al. |

OTHER PUBLICATIONS

Cheng et al., High thermal conductivity rGO/ZrB2—SiC ceramics consolidated from ZrB2—SiC particles decorated Go hybrid foam with enhanced thermal shock resistance, Journal of the European Ceramic Society, 40 (2020) 2760-2767, 8 pages.

Lin et al., Microchannelled hydroxyapatite components by sequential freeze drying and free pressureless spark plasma sintering, Advanced in Applied Ceramics, 2012, vol. 111, No. 5&6 269-274, 7 pages.

* cited by examiner ized water (e.g., deionized water with no additives)) to form a first slurry, a loading of UHTCs in the first slurry being at least 5 wt % (e.g., at least 10 wt %, about 10 wt %, or 10 wt %); adding a dispersant (e.g., polyacrylic acid (PAA)) to the first slurry to obtain a second slurry; and stirring the second slurry to obtain the UHTC slurry. The stirring of the second slurry can comprise stirring the second slurry at a first temperature for a first amount of time to maintain a pH of the second slurry constant (for example, the first temperature can room temperature and/or the first amount of time can be 5 hours or about 5 hours). The freeze-drying of the UHTC slurry can comprise: pouring the UHTC slurry into a container (e.g., a graphite crucible); and freezing and then subliming the UHTC slurry in the container to obtain the green body. The freeze-drying process can be performed for, e.g., 24 hours or about 24 hours. The performing of the SPS process can comprise: providing the green body in a container (e.g., the same container used for freeze-drying; for example, a graphite crucible); disposing the container with the green body in a die (e.g., a graphite die); and performing the SPS process on the green body in the container in the die at a second temperature for a second amount of time (for example, the second temperature can be 1850° C. or about 1850° C. and/or the second amount of time can be less than 30 minutes (e.g., less than 20 minutes, about 10 minutes, 10 minutes, or less than 10 minutes)). As mentioned, the entire SPS process can be performed and completed in less than 30 minutes (e.g., less than 20 minutes, about 10 minutes, 10 minutes, or less than 10 minutes).

In another embodiment, a UHTC foam can comprise macro-pores, meso-pores, and micro-pores, with a porosity of at least 30% (e.g., at least 40%, at least 45%, at least 48%, at least 50%, at least 54%, or at least 55%). The UHTC foam can have a thermal conductivity of less than 60 Watts per meter per Kelvin (W/m-K) (e.g., less than 50 W/m-K, less than 45 W/m-K, less than 40 W/m-K, less than 30 W/m-K, less than 25 W/m-K, less than 20 W/m-K, less than 15 W/m-K, or less than 10 W/m-K). The UHTC foam can be, for example, a TaC foam, a HfC foam, or a foam comprising TaC and HfC (e.g., at a ratio of for example 1:1 (TaC:HfC)). The foam comprising TaC and HfC can be, for example, a solid solution of TaC and HfC (e.g., at a ratio of for example 1:1 (TaC:HfC)).

ULTRA-HIGH TEMPERATURE CARBIDE FOAMS AND METHODS OF FABRICATING THE SAME

CROSS-REFERENCE TO RELATED APPLICATION

The present application is a continuation application of U.S. application Ser. No. 17/457,778, filed Dec. 6, 2021, the disclosure of which is hereby incorporated by reference in its entirety, including all figures, tables, and drawings.

GOVERNMENT SUPPORT

This invention was made with government support under DE-NA0003865 awarded by the Department of Energy. The government has certain rights in the invention.

BACKGROUND

Ultra-high temperature carbide (UHTC) ceramics are known for excellent stability at temperatures of at least 2000° C. These materials are also recognized as potential useful for thermal protection systems (TPS) due to capabilities beyond those of existing structural materials. However, bulk UHTCs intrinsically have very high lattice thermal conductivity, which limits their usefulness in the field of thermal insulation. When managing ultra-high thermal systems, thermal damages can be prevented or inhibited by materials that can either effectively dissipate heat (owing to high thermal conductivity, such as UHTCs) or provide thermal insulation (owing to low thermal conductivity). UHTC development is primarily focused on obtaining dense UHTCs.

BRIEF SUMMARY

Embodiments of the subject invention provide novel and advantageous ultra-high temperature carbide (UHTC) foams and methods of fabricating and using the same. The UHTC foams are crack-resistant and have low thermal conductivity, making them ideal for applications such as thermal insulation systems, filtration of high-temperature corrosive gases, catalyst support, and high-temperature solar absorptions. The UHTC foams are produced in a three-step process, including UHTC slurry preparation, freeze-drying, and spark plasma sintering (SPS). The fabrication methods allow for the production of any kind of single- or multi-component UHTC foam, while also providing flexibility in the shape and size of the UHTC foams to produce near-net-shape components.

In an embodiment, a method of fabricating a UHTC foam can comprise: preparing a UHTC slurry; freeze-drying the UHTC slurry to provide a green body; and performing an SPS process on the green body to provide the UHTC foam; the performing of the SPS process comprising disposing the green body such that punches of an SPS setup used for the SPS process do not touch (or make any physical contact with) the green body during the SPS process, the SPS process thereby being a pressure-less SPS process. The UHTC foam can be, for example, a tantalum carbide (TaC) foam, a hafnium carbide (HfC) foam, or a foam comprising TaC and HfC (e.g., at a ratio of for example 1:1 (TaC:HfC)). The foam comprising TaC and HfC can be, for example, a solid solution of TaC and HfC (e.g., at a ratio of for example 1:1 (TaC:HfC)). The preparing of the UHTC slurry can comprise: mixing UHTCs in a solvent (e.g., water, such as

DETAILED DESCRIPTION

Figure 1:
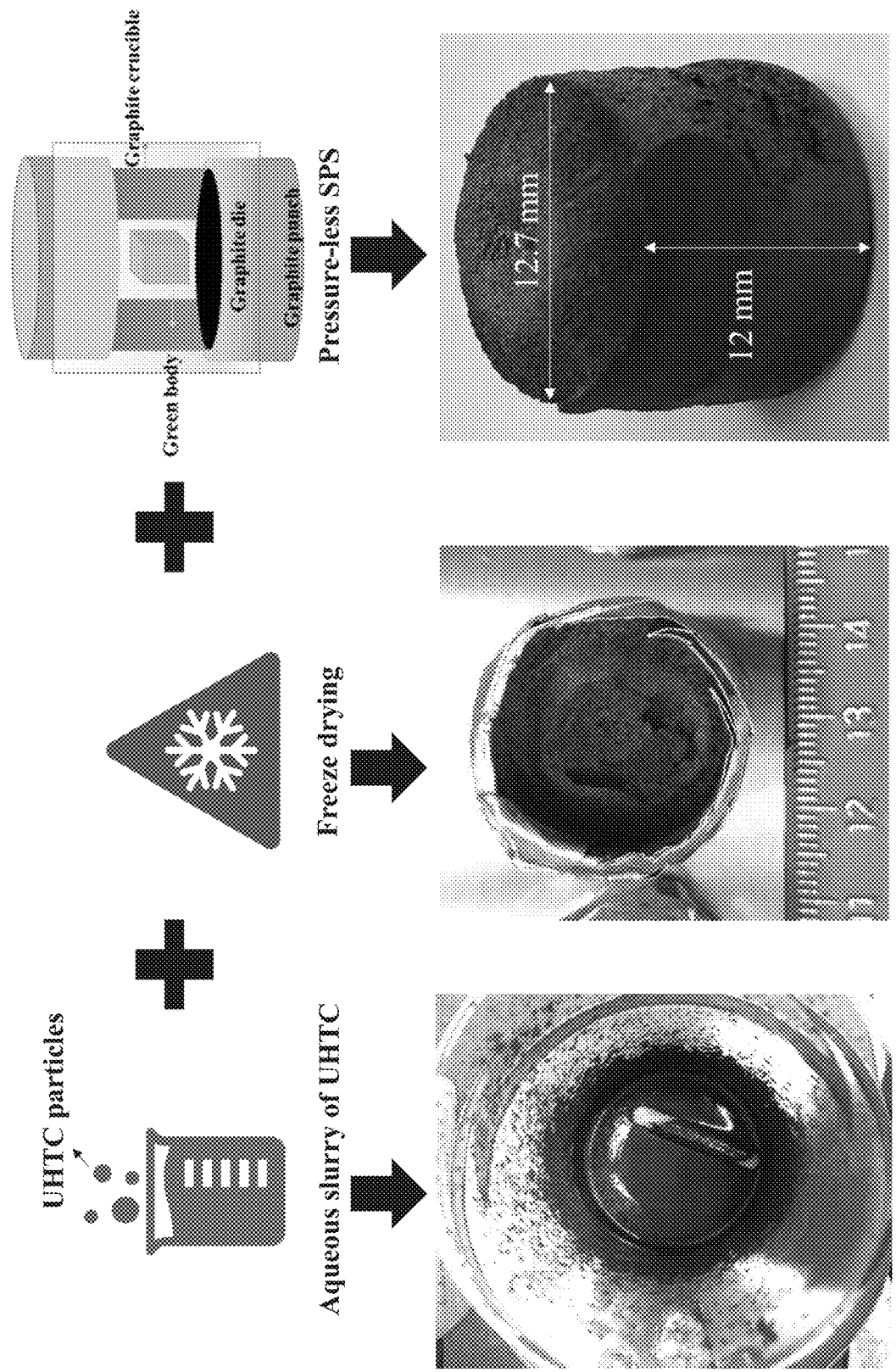
FIG. 1 shows a step-wise fabrication process for ultra-high temperature carbide (UHTC) foams, according to an embodiment of the subject invention. First, an aqueous slurry of UHTCs (e.g., with 10 wt % loading or about 10 wt % loading) can be prepared. A dispersant (e.g., polyacrylic acid (PAA)) with a loading of UHTC (e.g., 6 wt % or about 6 wt % of UHTC loading) can be added to obtain well-dissolved UHTC slurry. The solution/slurry can be stirred (e.g., constantly stirred at a set temperature for a set amount of time (e.g., room temperature for 5 hours (h) or about 5 h)) while maintaining the pH constant or fairly constant (e.g., constant at pH=8 or about 8) throughout the process. The solution can then be poured into a mold (e.g., a graphite mold such as a graphite crucible) and freeze dried (e.g., for a set amount of time such as 24 h or about 24 h). The mold can then be put inside a die (e.g., a spark plasma sintering (SPS) die) in such a way that the green body remains untouched by the two punches (e.g., graphite punches) in order to do pressure-less sintering. Though FIG. 1 lists graphite as the material for the die, crucible, and punch, this is for exemplary purposes only; also, though FIG. 1 lists dimensions (12.7 millimeters (mm) in diameter and 12 mm in height) for the fabricated UHTC foam, this is for exemplary purposes only and should not be construed as limiting.

Embodiments of the subject invention provide novel and advantageous ultra-high temperature carbide (UHTC) foams and methods of fabricating and using the same. The UHTC foams are crack-resistant and have low thermal conductivity, making them ideal for applications such as thermal insulation systems, filtration of high-temperature corrosive gases, catalyst support, and high-temperature solar absorptions. The UHTC foams are produced in a three-step process, including UHTC slurry preparation, freeze-drying, and spark plasma sintering (SPS). The fabrication methods allow for the production of any kind of single- or multi-component UHTC foam, while also providing flexibility in the shape and size of the UHTC foams to produce near-net-shape components. It is noted that a UHTC material is defined as showing good stability at a temperature of at least 2000° C.

Contrary to existing UHTC ceramics, the development of which is focused on dense UHTCs, embodiments of the subject invention can provide porous UHTC foams. The porosity in the UHTC is not a defect, but rather a functional property tailored specifically for the final application (e.g., thermal insulation systems, filtration of high-temperature corrosive gases, catalyst support, and/or high-temperature solar absorptions). These UHTC foams provide an advantageous combination of properties of low overall weight and low thermal conductivity. This solves the concerns related to the durability of UHTCs and, combined with the other advantages of these UHTC foams of embodiments of the subject invention, can end up saving huge amounts of money per pound of payload-to-orbit for rockets.

Prior to the UHTC foams of embodiments of the subject invention, the development of foams of high-temperature materials involved replication methods, direct foaming methods, precursor infiltration and pyrolysis, and chemical vapor deposition (CVD). Due to high covalent bonding and low self-diffusion coefficients, sintering of UHTC foams is challenging. Prolonged sintering time and high sintering temperature can significantly affect the pore size, interconnecting structure, and density of the foams. Moderate sintering temperature can affect the hand ability of the UHTC foams. Hence, the currently available related art methods that could be used to fabricate UHTC foams are time-consuming, expensive, and/or result in foams with poor mechanical strength.

Embodiments of the subject invention provide novel foam-gel, casting-freeze-drying (FD) technology to fabricate bulk porous UHTCs. As a field-assisted sintering technique, SPS is known to obtain porous materials by partial or controlled densification. In embodiments of the subject invention, the SPS process can be calibrated to be used as a pressure-less technique. The usage of SPS as a pressure-less technique can be divided into: (i) retarded grain growth for enhanced mechanical strength; (ii) retaining the porous structure obtained during FD with controlled pore-shape, pore-size, and/or interconnection; and (iii) consolidation in a short time. Thus, the calibrated SPS of the porous green body of UHTCs maintains the ultra-high porosity of UHTCs having low thermal conductivity and high strength. This technique applies to all high-temperature ceramic classes, including UHTCs and high-entropy UHTCs (HE-UHTCs).

The microstructure properties of foams are strongly dependent on the preparation protocols. Partial sintering is the most straightforward route for fabricating porous ceramics, but this method usually results in either lower porosity or lower strength foams. Ceramic foams with high porosity are typically prepared by a replica, sacrificial template, and direct foaming method, in which pre-ceramic polymers are involved. All of these methods have only been applied to oxides and silicon-based non-ceramic foams.

In many embodiments of the subject invention, no hazardous surfactants/dispersants are used. The liquid medium for UHTC dispersion can be, for example, water (e.g., deionized water, such as deionized water with no additives), and the dispersant for UHTC dispersion can be, for example, polyacrylic acid (PAA). Embodiments therefore provide an inexpensive, non-toxic, environmentally-friendly way to prepare UHTC slurries. The dispersion of the UHTC can be done by stirring the solution while maintaining a pH of 8 (or about 8). This mixing process is controllable, facile, and can be easily scaled up from laboratory scale to industry scale. The unique combination of FD and calibrated SPS techniques offers an attractive combination of properties of low overall weight, low thermal conductivity, and high mechanical strength for the fabricated UHTC foams. The methods of embodiments of the subject invention provide flexibility in the shape and size of the UHTC foams, allowing for production of near-net-shape components.

FIG. 1 shows a step-wise fabrication method for ultra-high temperature carbide (UHTC) foams, according to an embodiment of the subject invention. The method can include UHTC slurry preparation, freeze drying, and SPS.

First, an aqueous slurry of UHTCs (e.g., with 10 wt % loading or about 10 wt % loading) can be prepared. A dispersant (e.g., PAA) with a loading of UHTC (e.g., 6 wt % or about 6 wt % of UHTC loading) can be added to obtain well-dissolved UHTC slurry. The solution/slurry can be stirred (e.g., constantly stirred at a set temperature for a set amount of time (e.g., room temperature for 5 hours (h) or about 5 h)) while maintaining the pH constant or fairly constant (e.g., constant at pH=8 or about 8) throughout the process. By maintaining the pH, a polymer ratio to UHTC carbide loading is controllable to obtain repeatable and scalable production methods.

The solution/slurry can then be poured into a mold (e.g., a graphite mold such as a graphite crucible) and freeze dried (e.g., for a set amount of time such as 24 h or about 24 h) to obtain a green body. The freeze drying can include the slurry being frozen and then subsequently sublimed in a freeze drying (e.g., for a set amount of time such as 24 h or about 24 h) to obtain the green body. The use of the freeze drying technique on UHTCs is performed here for the first time on monolithic UHTCs (e.g., TaC, HfC) and a binary composite (e.g., TaC-HfC).

The green body obtained from the FD technique can be sintered by calibrating a conventional SPS setup. The green body can be kept inside a container (e.g., a graphite container and/or a crucible, such as a graphite crucible). The whole assembly, including the green body and the container, can be put inside a die (e.g., a graphite die). In the modified punch design, the working space can remain constant between the punches of the SPS setup by not touching the green body sample inside the die (e.g., a standard graphite die), resulting in zero external pressure. The SPS parameters can be configured for pressure-less sintering (e.g., at a set temperature for a set amount of time, such as at 1850° C. or about 1850° C. for 10 minutes (min) or about 10 min). After the pressure-less SPS, the final UHTC foam is obtained (see, e.g., FIGS. 2(a), 2(b), 2(c), and the bottom-right corner of FIG. 1).

The thermal insulation properties of the UHTC foam can be altered by adjusting the kinetics (during SPS processing), which regulates the mutual solubility in two/multi-component UHTCs. For example, partial solid-solution formation in a two-component UHTC (TaC-HfC) system with a sintering time of 10 mins has been shown (see, e.g., Example 1). The tailoring of the thermal insulation can be further done by adding more components in a UHTC system while maintaining the same mechanical integrity or improving the mechanical integrity. The methods of embodiments of the subject invention can also be used to make UHTC foams of desired shape and size.

Embodiments of the subject invention provide a practical approach to ultra-light, strong UHTCs for thermal insulation. Ultra-high porosity and low sintering shrinkage are attributed to the fact that the freeze-drying technique reduces surface tension and UHTC particles have very low self-diffusion during sintering. Also, the shorter dwelling time during SPS (e.g., less than 30 min, such as 10 min or about 10 min) preserves the FD porous structure while achieving high mechanical strength.

UHTC foams of embodiments of the subject invention can be used in various engineering applications, including in the energy and aerospace sectors. Applications of the UHTC foams can include high-temperature thermal insulation, support membrane for catalysis, hot/corrosive gas infiltration, high-temperature solar absorption, concentrated solar power (CSP), solar receivers, thermo-electric conversion, hypersonic vehicles, atmospheric entry probes, radiant burners, gas and/or chemical sensors, insulator panels, and thrust chambers and/or rocket nozzles in a space propulsion system.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., sub-ranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

The three-step process as shown in FIG. 1 was performed to prepare UHTC foams of TaC, HfC, and TaC-HfC, with the three steps being UHTC slurry preparation, freeze-drying, and SPS.

For each UHTC foam (TaC, HfC, and TaC-HfC), the preparation method was as follows. An aqueous slurry of UHTCs with 10 wt % loading was prepared. A PAA dispersant with 6 wt % of UHTC loading was added to obtain well dissolved UHTC slurry. The solution/slurry was constantly stirred at room temperature for 5 h while maintaining the pH at 8 throughout the process. The UHTC aqueous dispersion/slurry was poured into a graphite mold, frozen and subsequently sublimed in a freeze dryer for 24 h to obtain a green body. The green body was sintered by calibrating a conventional spark plasma sintering (SPS) setup. The green body was kept inside a graphite crucible, and this whole assembly was put inside the graphite die. The working space remained constant between the punches of the SPS setup by not touching the sample/green body inside the standard graphite die, resulting in zero external pressure. The SPS parameters were configured for pressure-less sintering at 1850° C. for 10 min to give the UHTC foam.

Figure 2A:
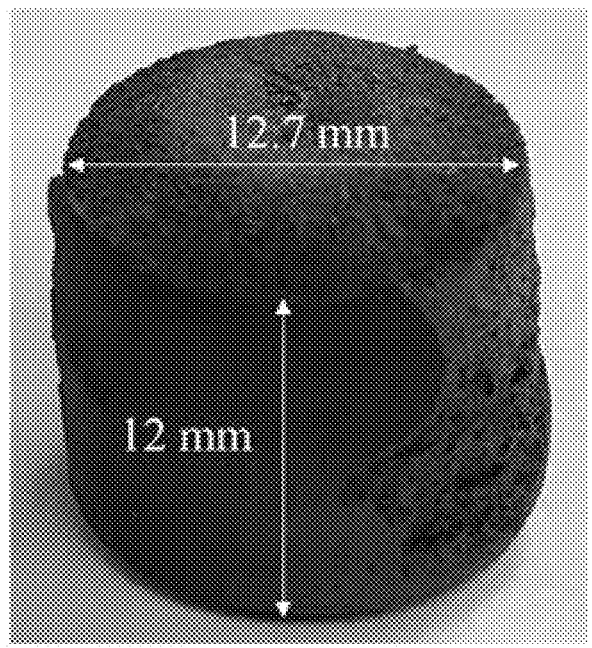
FIG. 2(a) shows an image of a fabricated UHTC foam for tantalum carbide (TaC). Though FIG. 2(a) lists dimensions (12.7 mm in diameter and 12 mm in height) for the fabricated UHTC foam, this is for exemplary purposes only and should not be construed as limiting.
Figure 2B:
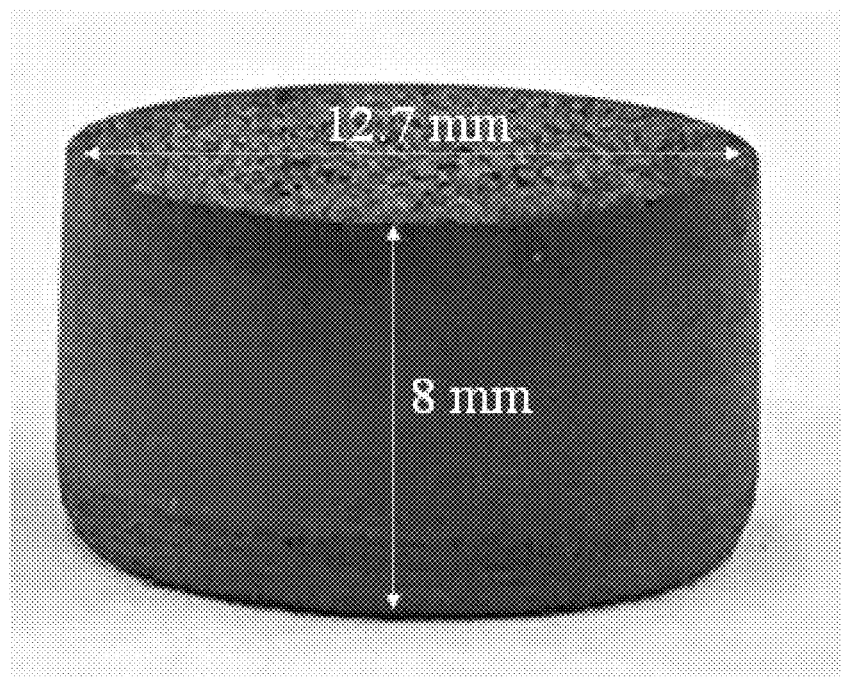
FIG. 2(b) shows an image of a fabricated UHTC foam for hafnium carbide (HfC). Though FIG. 2(b) lists dimensions (12.7 mm in diameter and 8 mm in height) for the fabricated UHTC foam, this is for exemplary purposes only and should not be construed as limiting.
Figure 2C:
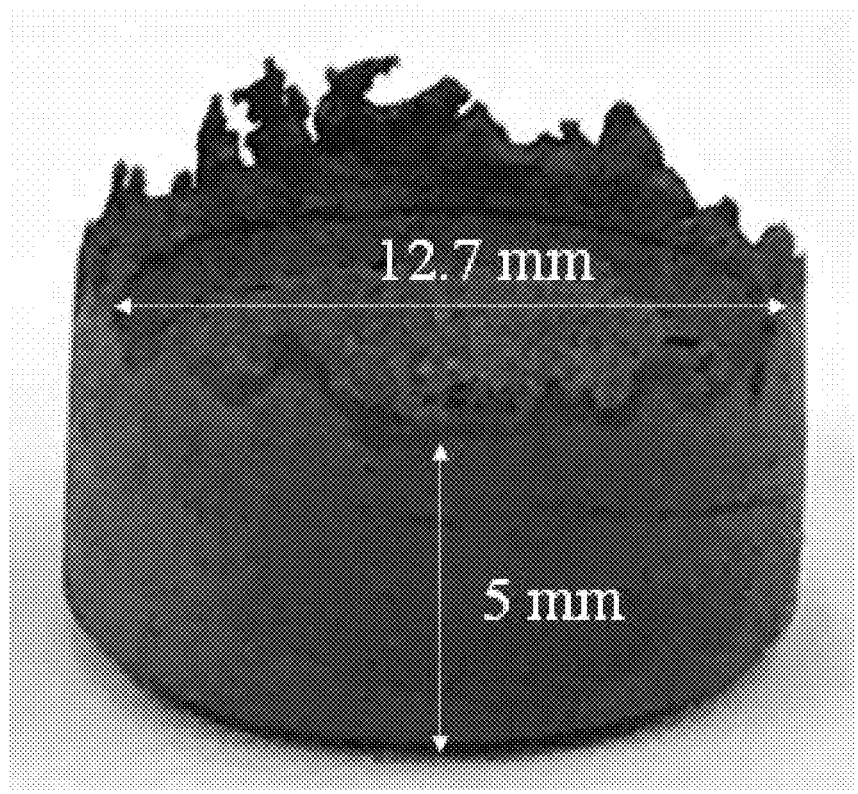
FIG. 2(c) shows an image of a fabricated UHTC foam for TaC and HfC (TaC-HfC). Though FIG. 2(c) lists dimensions (12.7 mm in diameter and 5 mm in height) for the fabricated UHTC foam, this is for exemplary purposes only and should not be construed as limiting.
Figure 3A:
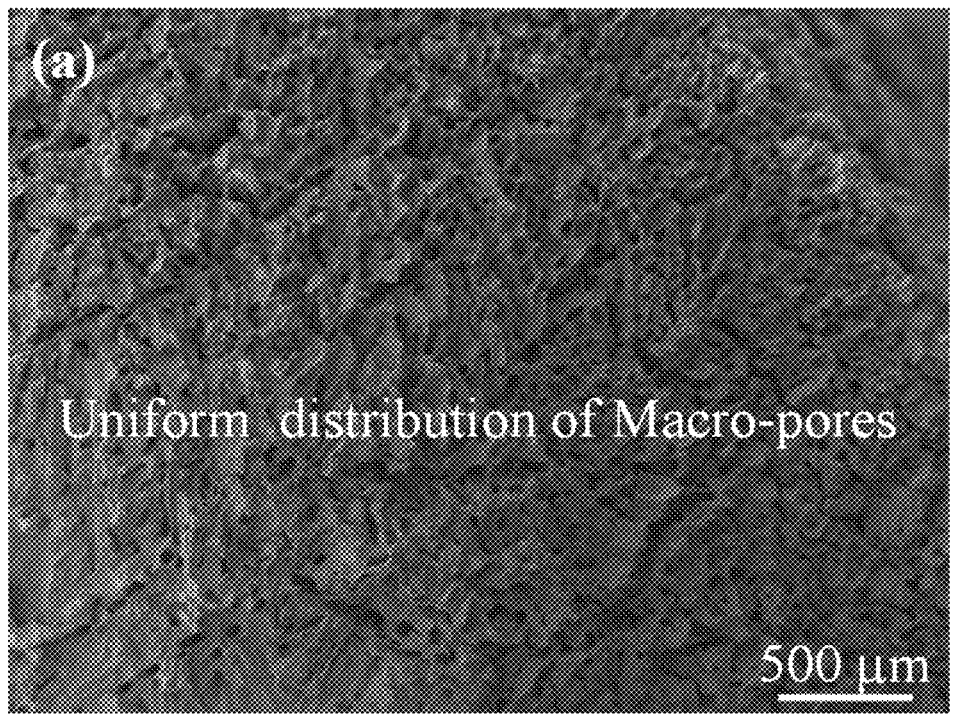
FIG. 3(a) shows a scanning electron microscope (SEM) image for TaC foam, showing uniform distribution of macro-pores. The scale bar is 500 micrometers (μm).
Figure 3B:
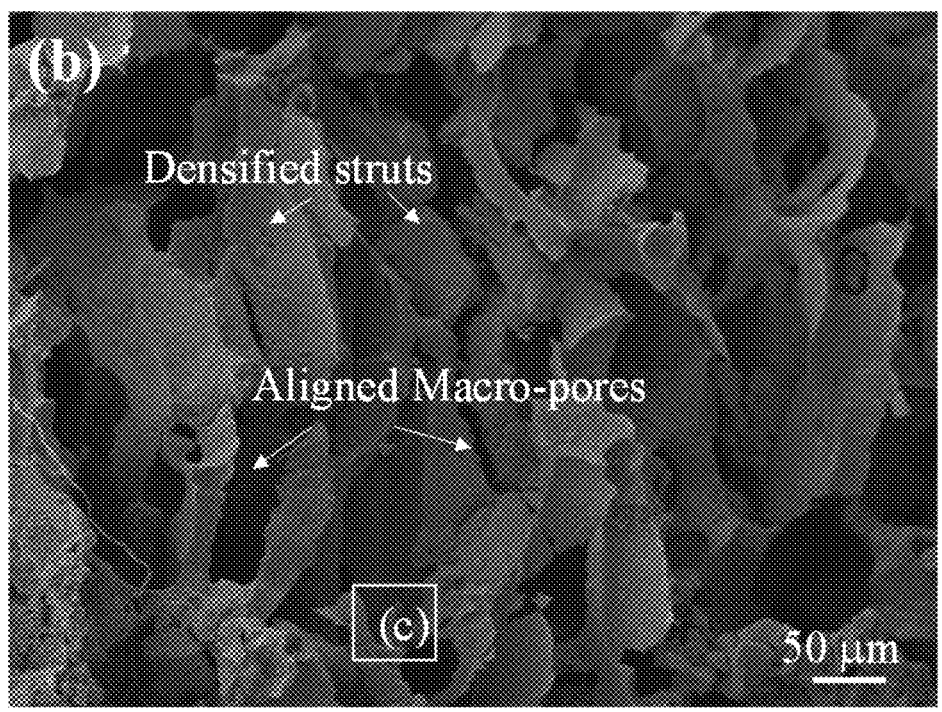
FIG. 3(b) shows an SEM image for TaC foam, showing densified struts and aligned macro-pores. The scale bar is 50 μm.
Figure 3C:
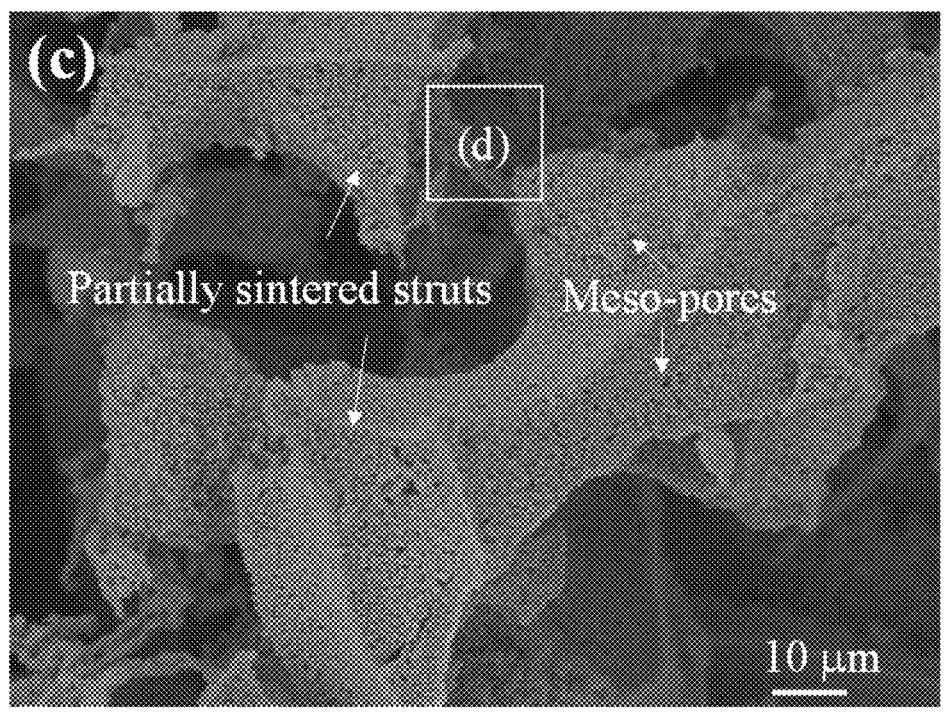
FIG. 3(c) shows an SEM image of the identified square in FIG. 3(b), showing partially sintered struts and meso-pores in the TaC foam. The scale bar is 10 μm.
Figure 3D:
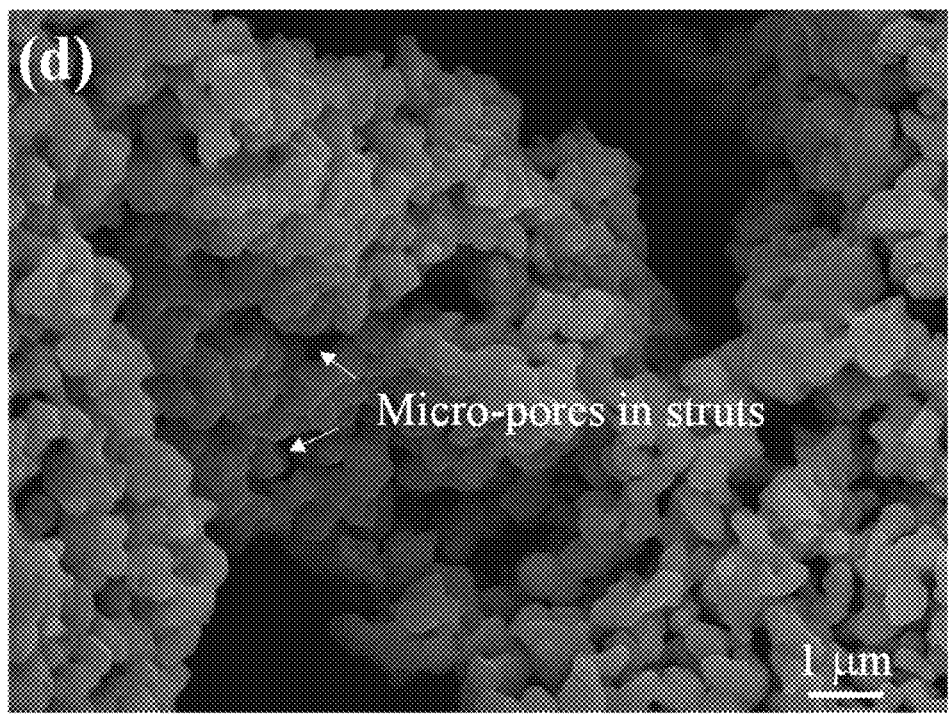
FIG. 3(d) shows an SEM image of the identified square in FIG. 3(c), showing micro-pores in struts in the TaC foam. The scale bar is 1 μm.
Figure 4A:
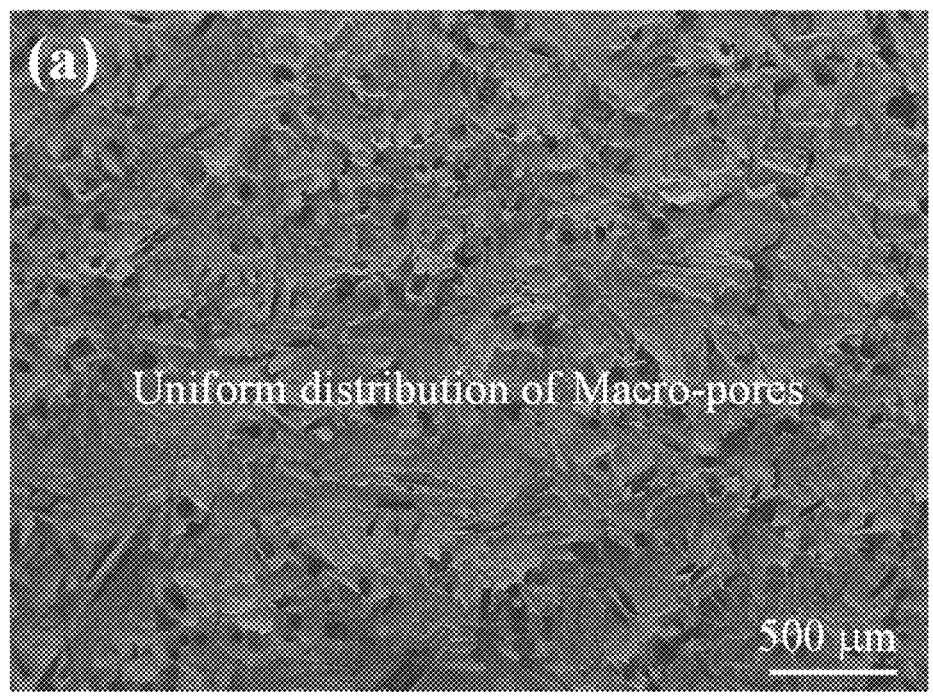
FIG. 4(a) shows an SEM image for HfC foam, showing uniform distribution of macro-pores. The scale bar is 500 μm.
Figure 4B:
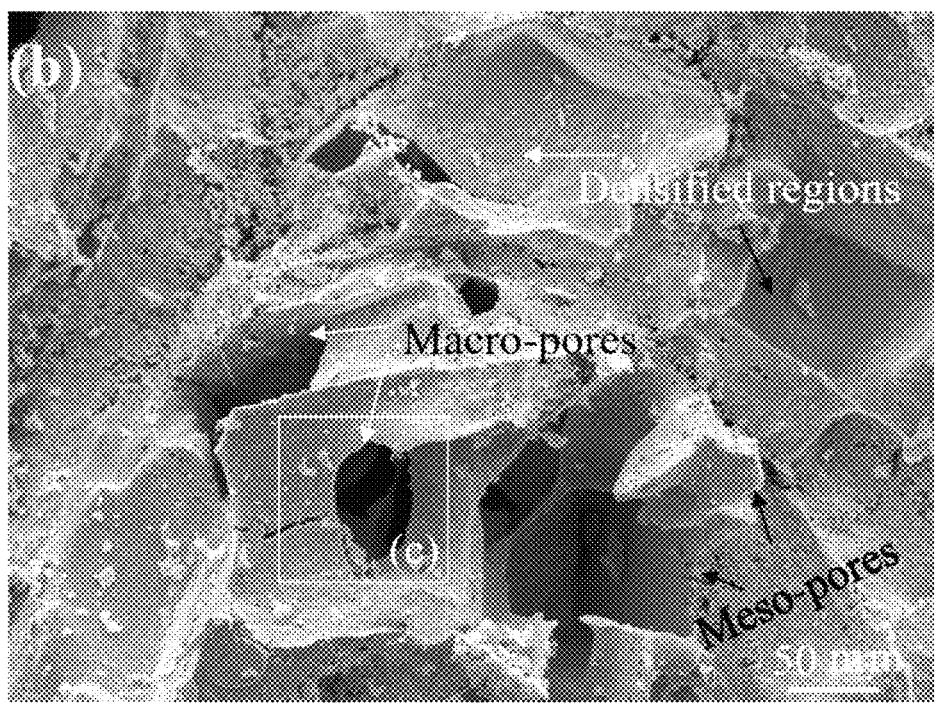
FIG. 4(b) shows an SEM image for HfC foam, showing densified regions, macro-pores, and meso-pores. The scale bar is 50 μm.
Figure 4C:
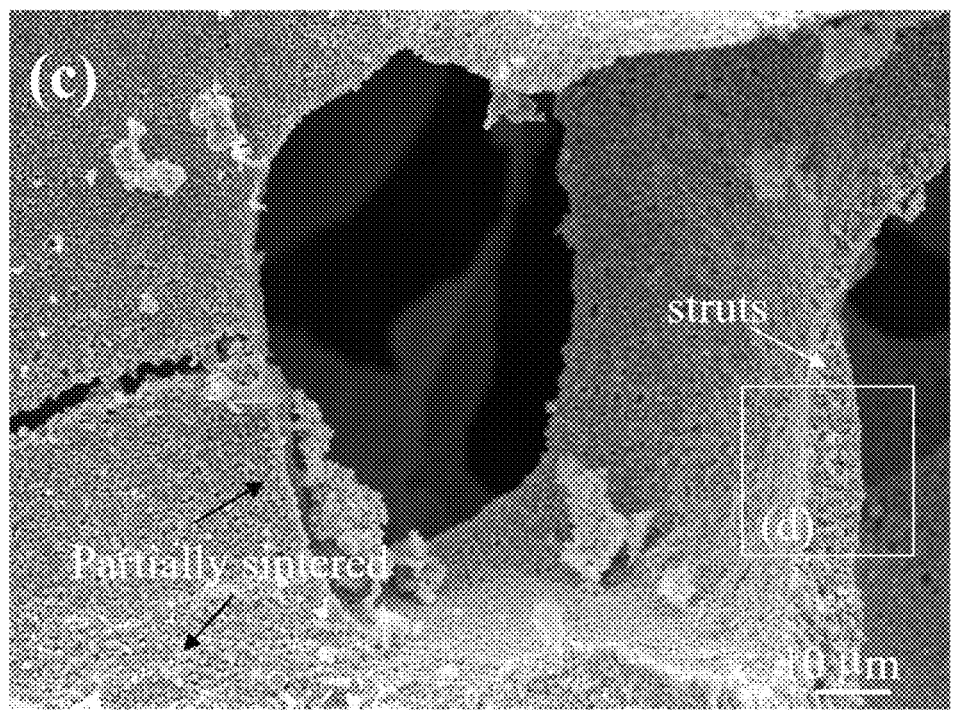
FIG. 4(c) shows an SEM image of the identified square in FIG. 4(b), showing partially sintered struts in the HfC foam. The scale bar is 10 μm.
Figure 4D:
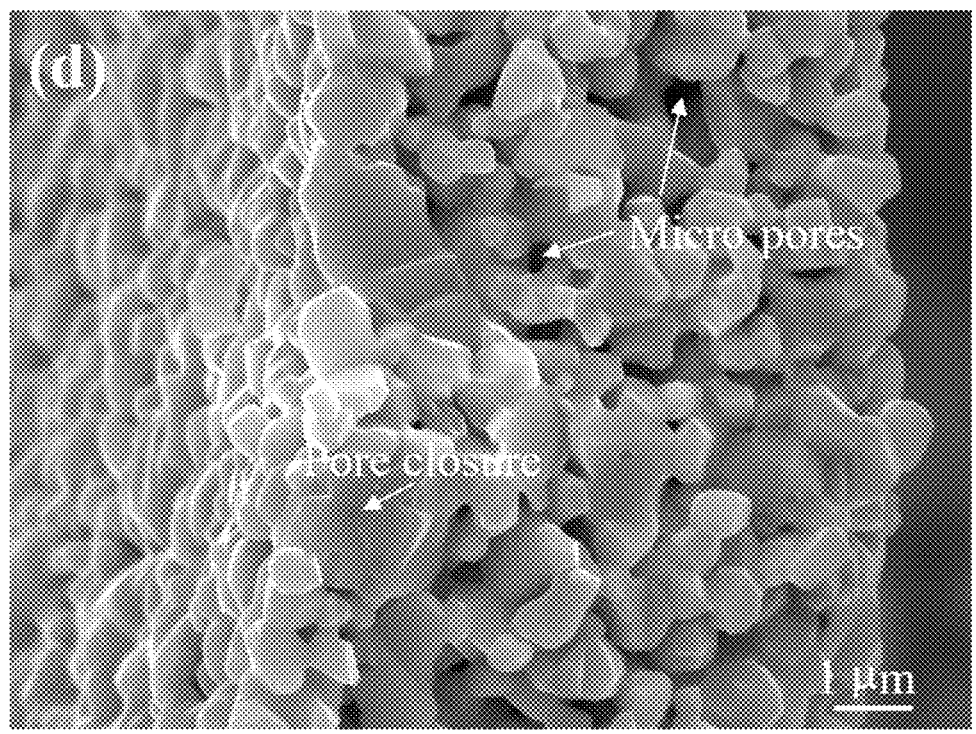
FIG. 4(d) shows an SEM image of the identified square in FIG. 4(c), showing micro-pores and pore closure in the HfC foam. The scale bar is 1 μm.
Figure 5A:
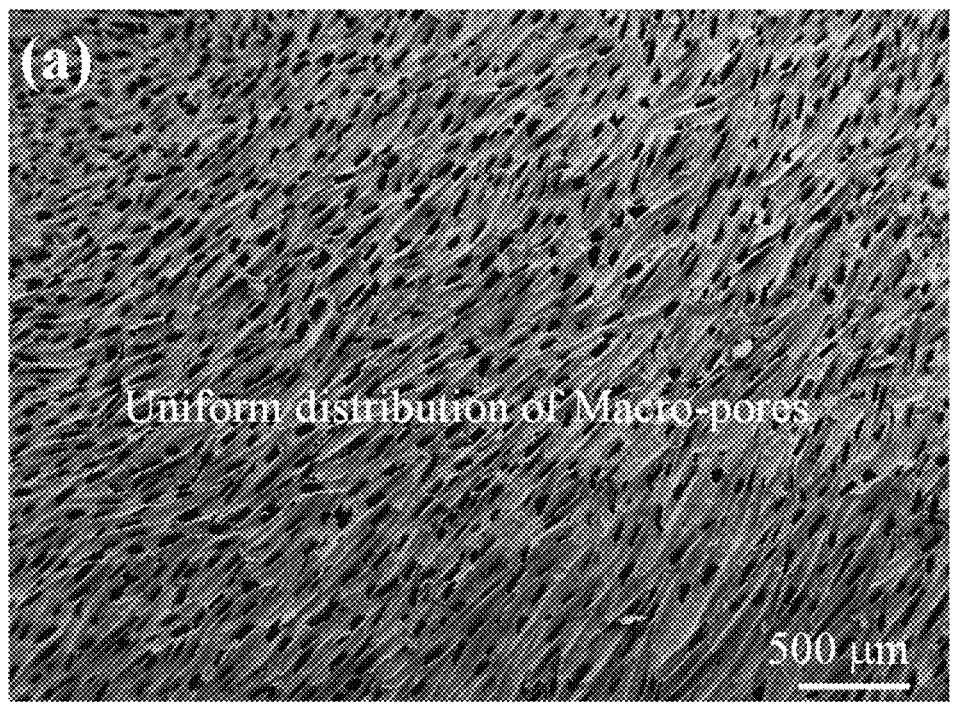
FIG. 5(a) shows an SEM image for TaC-HfC foam, showing uniform distribution of macro-pores. The scale bar is 500 μm.
Figure 5B:
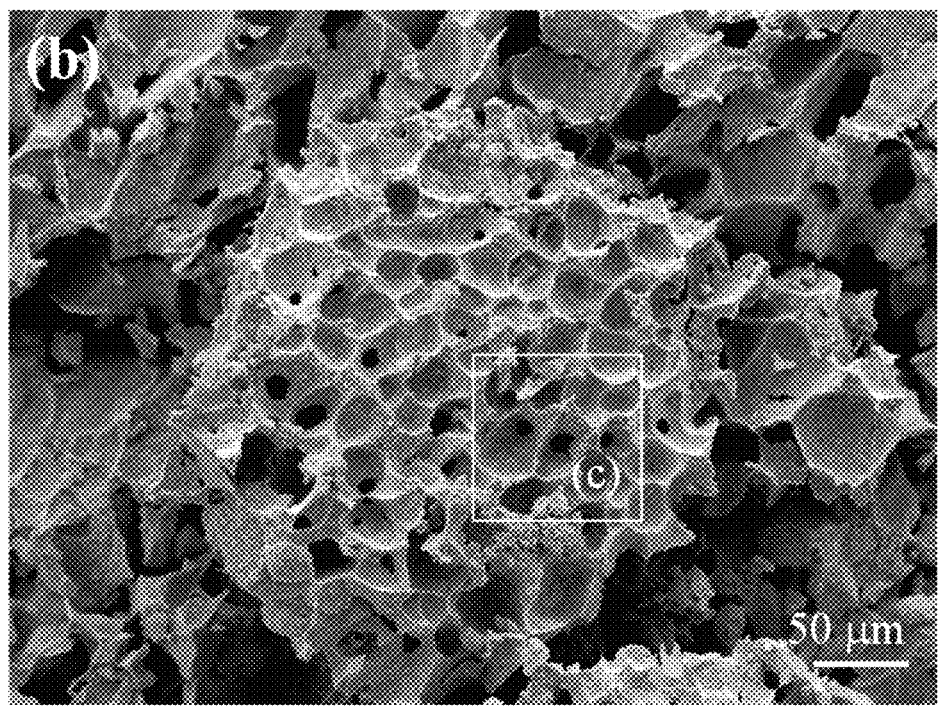
FIG. 5(b) shows an SEM image for TaC-HfC foam. The scale bar is 50 μm.
Figure 5C:
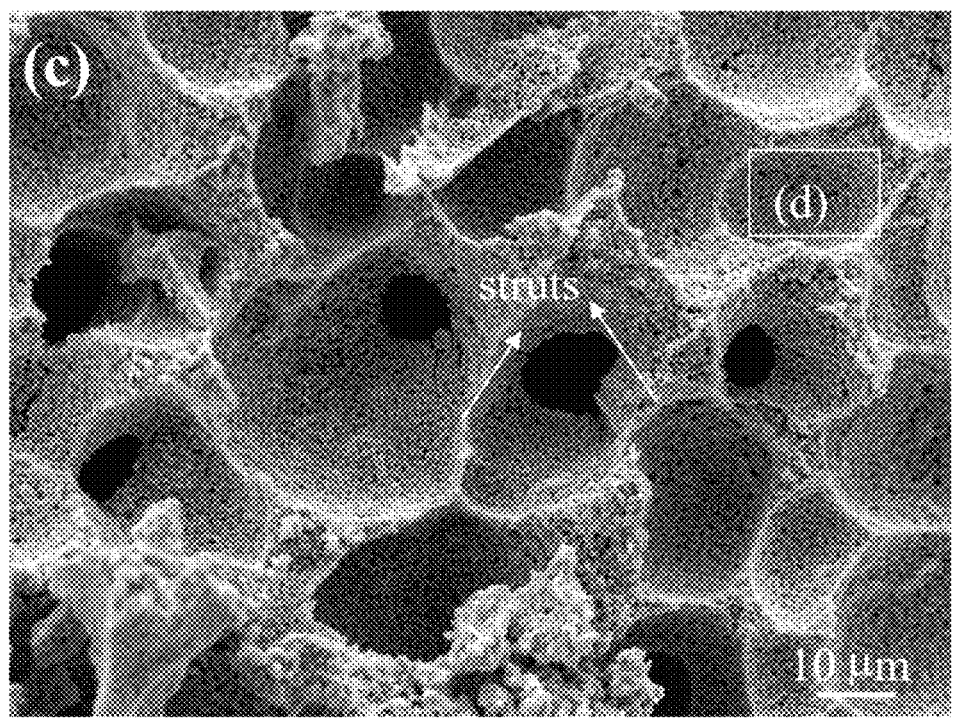
FIG. 5(c) shows an SEM image of the identified square in FIG. 5(b), showing struts in the TaC-HfC foam. The scale bar is 10 μm.
Figure 5D:
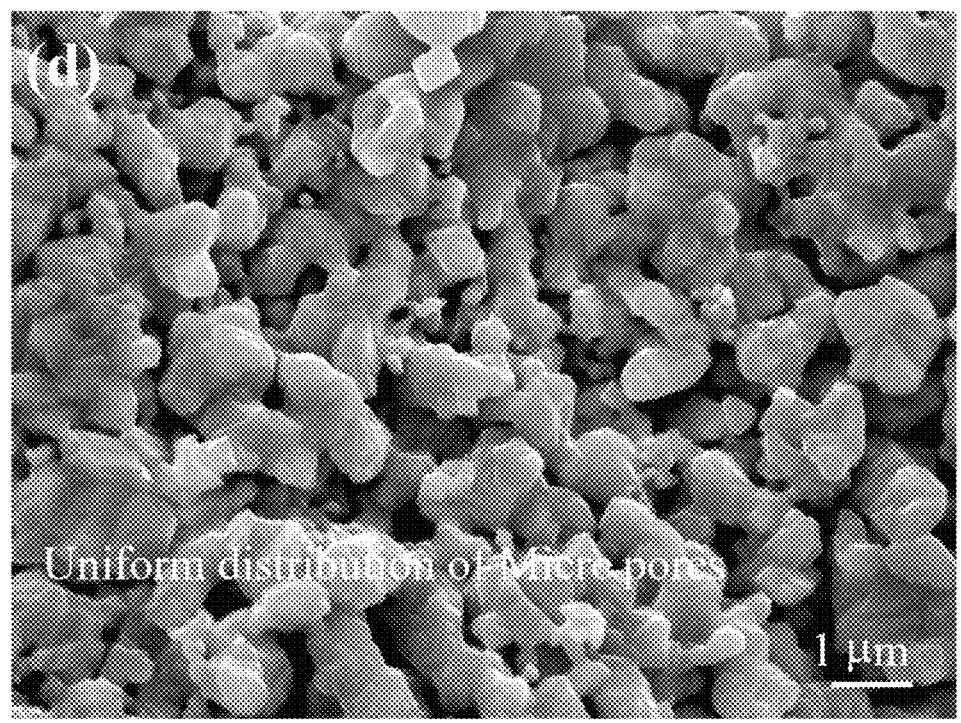
FIG. 5(d) shows an SEM image of the identified square in FIG. 5(c), showing uniform distribution of micro-pores in the TaC-HfC foam. The scale bar is 1 μm.
Figure 6:
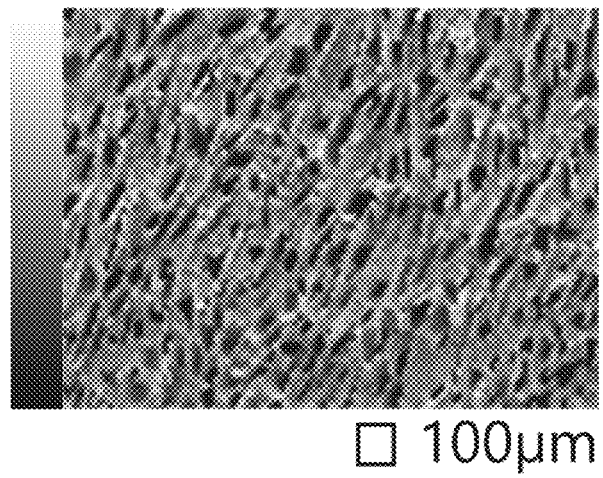
FIG. 6 shows an area selected for energy dispersive spectroscopy (EDS) mapping in TaC-HfC foam. The scale bar is 100 μm.
Figure 7:
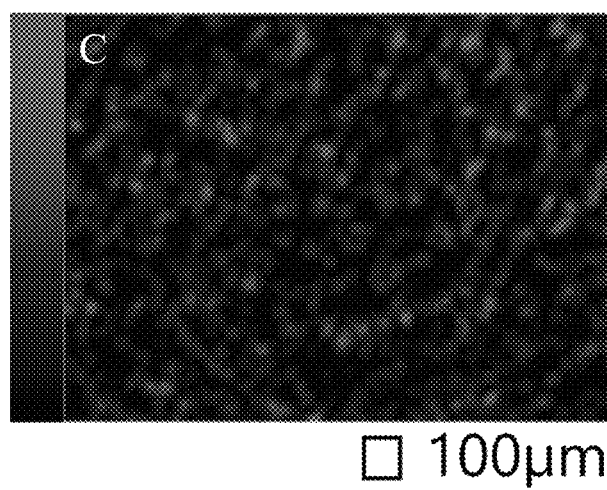
FIG. 7 shows EDS mapping for the carbon (C) in the TaC-HfC foam from FIG. 6. The scale bar is 100 μm.
Figure 8:
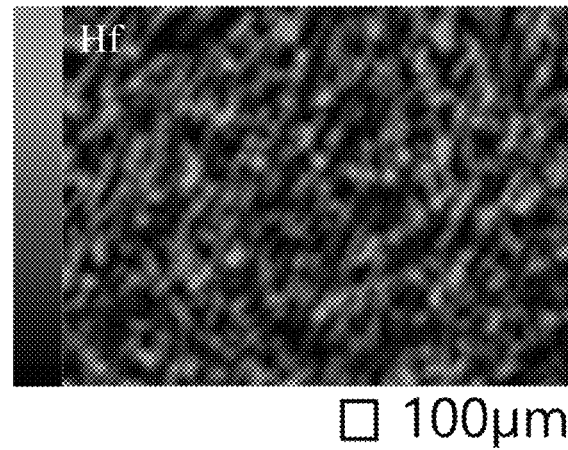
FIG. 8 shows EDS mapping for the Hf in the TaC-HfC foam from FIG. 6. The scale bar is 100 μm.
Figure 9:
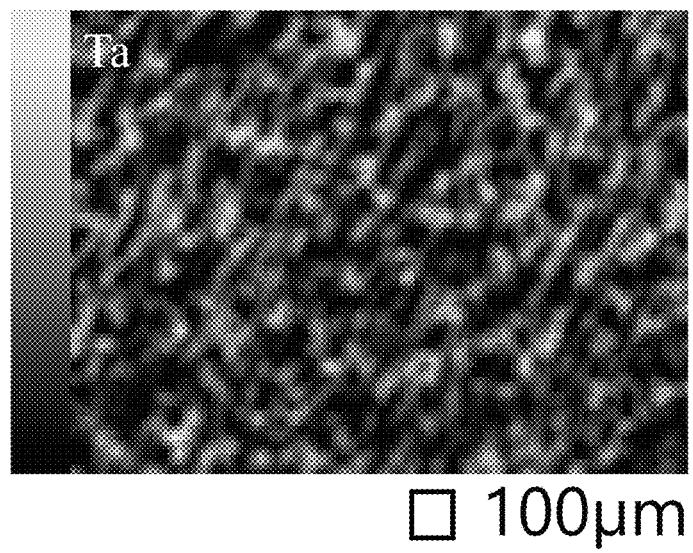
FIG. 9 shows EDS mapping for the Ta in the TaC-HfC foam from FIG. 6. The scale bar is 100 μm.
Figure 10:
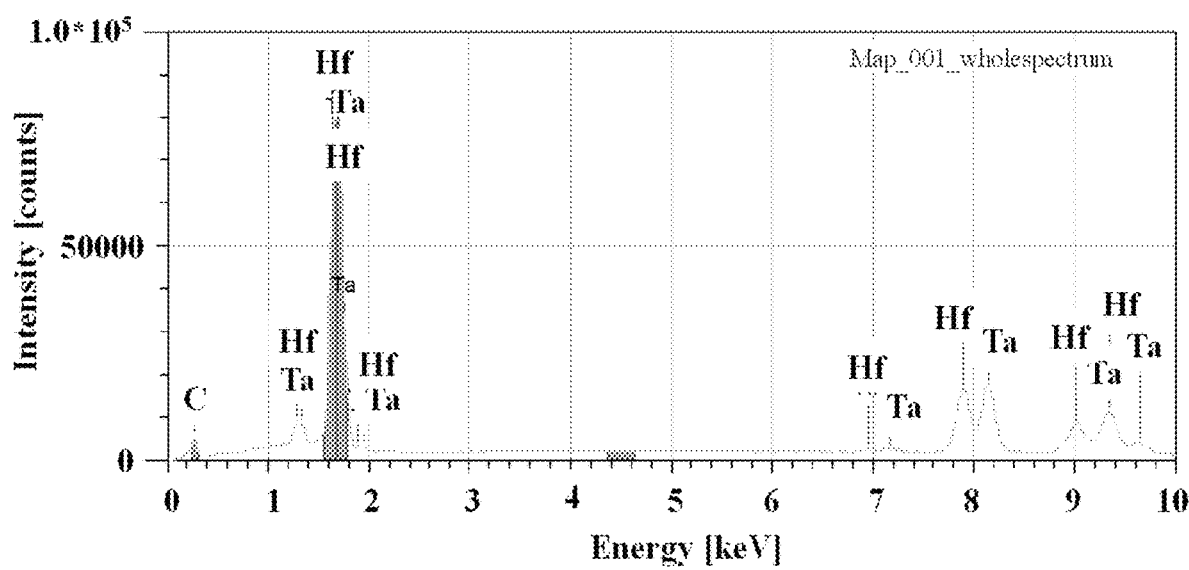
FIG. 10 shows the intensity (counts) versus energy (in kilo-electron Volts (keV)) for the EDS mapping for the TaC-HfC foam, showing uniform solid-solution formation in the foam from FIG. 6.

FIGS. 2(a), 2(b), and 2(c) show the fabricated UHTC foams for TaC, HfC, and TaC-HfC, respectively. The dimensions listed in FIGS. 2(a), 2(b), and 2(c) show the dimensions of the as-fabricated foams. FIGS. 3(a)-5(d) show scanning electron microscope (SEM) images of the UHTC foams, with FIGS. 3(a)-3(d) showing TaC foam, FIGS. 4(a)-4(d) showing HfC foam, and FIGS. 5(a)-5(d) showing TaC-HfC foam. Referring to FIGS. 3(a)-5(d), the microstructure of the TaC, HfC, and TaC-HfC foams showed the presence of macro-pores, meso-pores, and micro-pores with directionality in pore alignment during FD. The relative porosity in TaC, HfC, and TaC-HfC foams was about 54%, about 55%, and about 48%, respectively. The EDS mapping to show the solid-solutioning in TaC-HfC foam is presented in FIGS. 6-10. The terms "macro-pores", "meso-pores", and "micro-pores" are used herein to denote pore size variation (i.e., three different ranges of pore sizes). Referring to FIGS. 4(a)-4(d), as the skilled person would understand from these figures, macro-pores as used herein refers to pores having a diameter of from about 40 μm to 80 μm, meso-pores as used herein refers to pores having a diameter on the order of tens of μm (but less than 40 μm; e.g., from 10 μm to 30 μm), and micro-pores refers to pores having a diameter on the order of hundreds of nanometers (nm).

Figure 11:
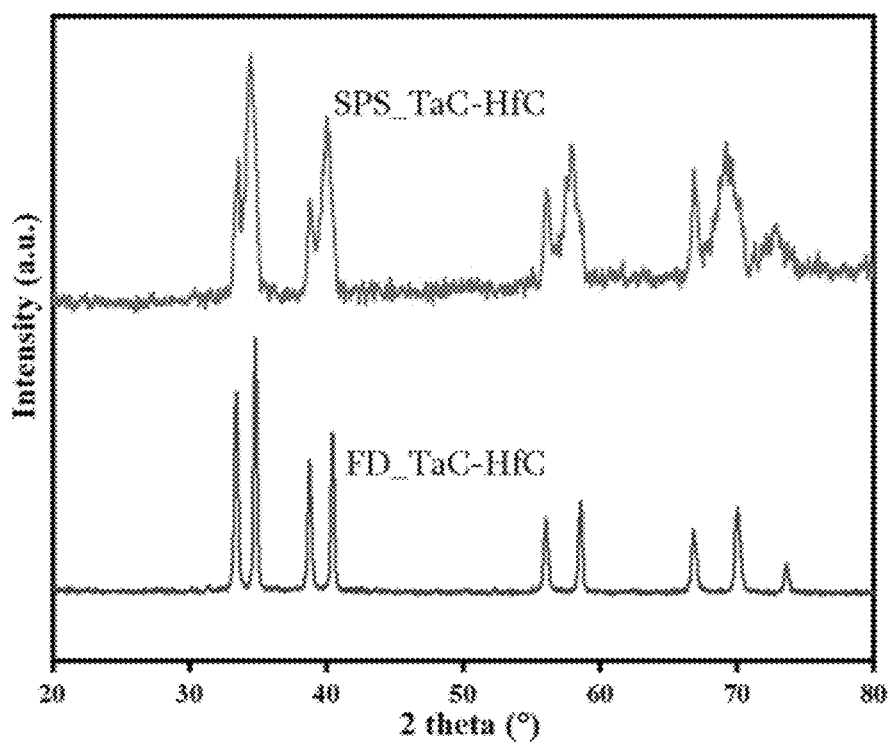
FIG. 11 shows a comparison of X-ray diffraction (XRD) spectra of freeze dried TaC-HfC UHTC foam (labeled "FD_TaC-HfC" in FIG. 11) and pressure-less SPS TaC-HfC UHTCs (labeled "SPS_TaC-HfC" in FIG. 11). The partial solid solutioning was observed in TaC-HfC foam after sintering.
Figure 12:
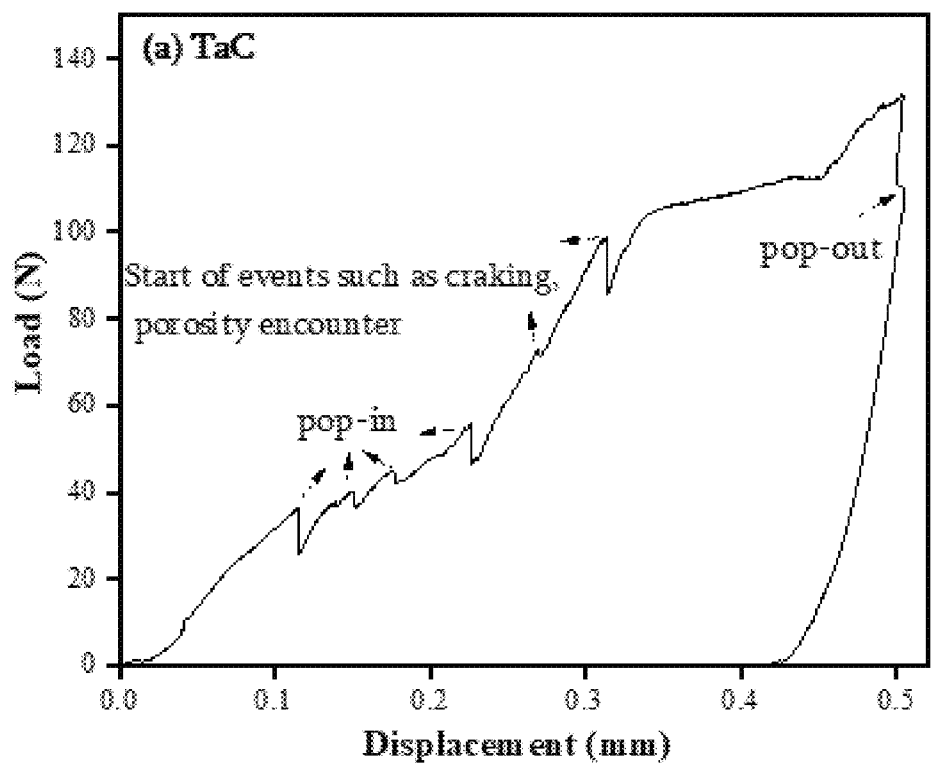
FIG. 12 shows a plot of load (in Newtons (N)) versus displacement (in mm) for showing position control high load indentation, showing the mechanical integrity (along with load bearing capabilities) for TaC foam. Indentations were carried out using a spherical tip (R=about 3 mm) at a rate of 0.1 millimeters per minute (mm/min) up to 20% of its initial height using a 4000 N capacity load cell. The corresponding load in the sample obtained relates to the load bearing capacity of the sample. The kinks in the curve correspond to the events such as porosity encounter, crack initiation, crack propagation, and failure in the foam. The TaC foam did not break during testing.
Figure 13:
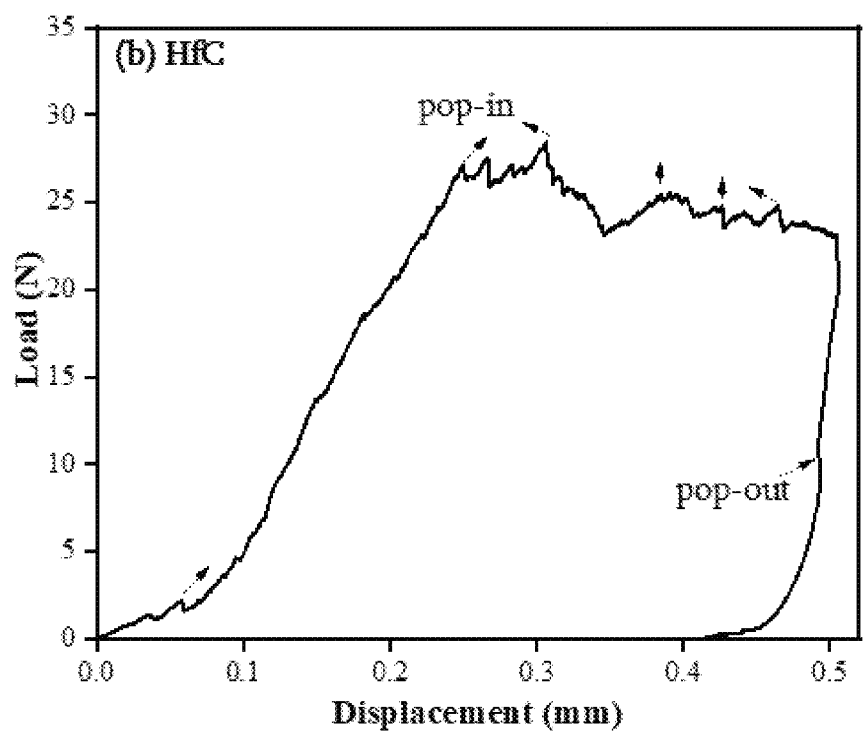
FIG. 13 shows a plot of load (in N) versus displacement (in mm) for showing position control high load indentation, showing the mechanical integrity (along with load bearing capabilities) for HfC foam. The testing was carried out as described for FIG. 12. The HfC foam did not break during testing.
Figure 14:
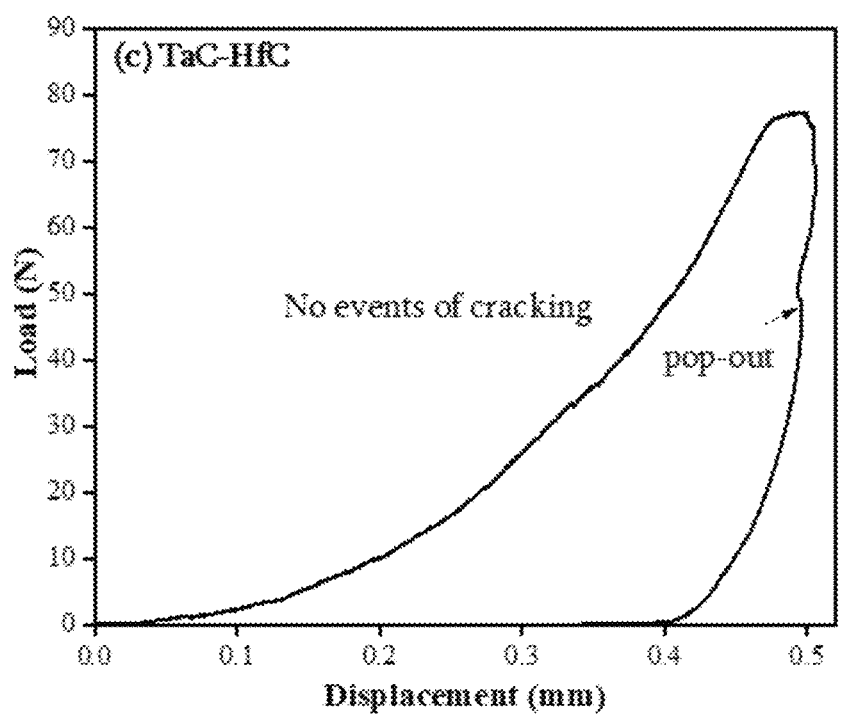
FIG. 14 shows a plot of load (in N) versus displacement (in mm) for showing position control high load indentation, showing the mechanical integrity (along with load bearing capabilities) for TaC-HfC foam. The testing was carried out as described for FIG. 12. The TaC-HfC foam did not break during testing.

FIG. 11 shows the X-ray diffraction (XRD) analysis of the TaC-HfC foam, which further confirms the partial solid-solutioning in TaC-HfC foam during the pressure-less SPS process. FIGS. 12-14 show the position control high load indentation for the TaC, HfC, and TaC-HfC foams, respectively, to predict the strength of these foams based on load bearing ability against crack growth. The results showed that partial solid-solutioning in the UHTC foams leads to better mechanical integrity in the TaC-HfC foam as compared to the parent UHTC foams (TaC and HfC). The load-bearing capacity was observed to be highest for TaC foam (about 120 N). This is due to bigger macro-pores (~40-80 μm) in the material, which during indentation leads to early cracking but at the same time compacting the pore walls (struts), leading to pore closure at a faster rate. However, in the case of HfC foam, the relatively high densification of the struts and smaller macro-pores (<50 μm), instead of compaction cracking of struts, is more prominent, diminishing its load. The densified regions (dense struts) are more pronounced in HfC foam than TaC (see FIGS. 3(a)-4(d)). The macro-pores in TaC-HfC are comparable to that of HfC foam. Still, due to partial solid-solutioning, there is no evidence of cracking observed while maintaining moderate load-bearing (about 80 N) in the TaC-HfC foam.

Figure 15:
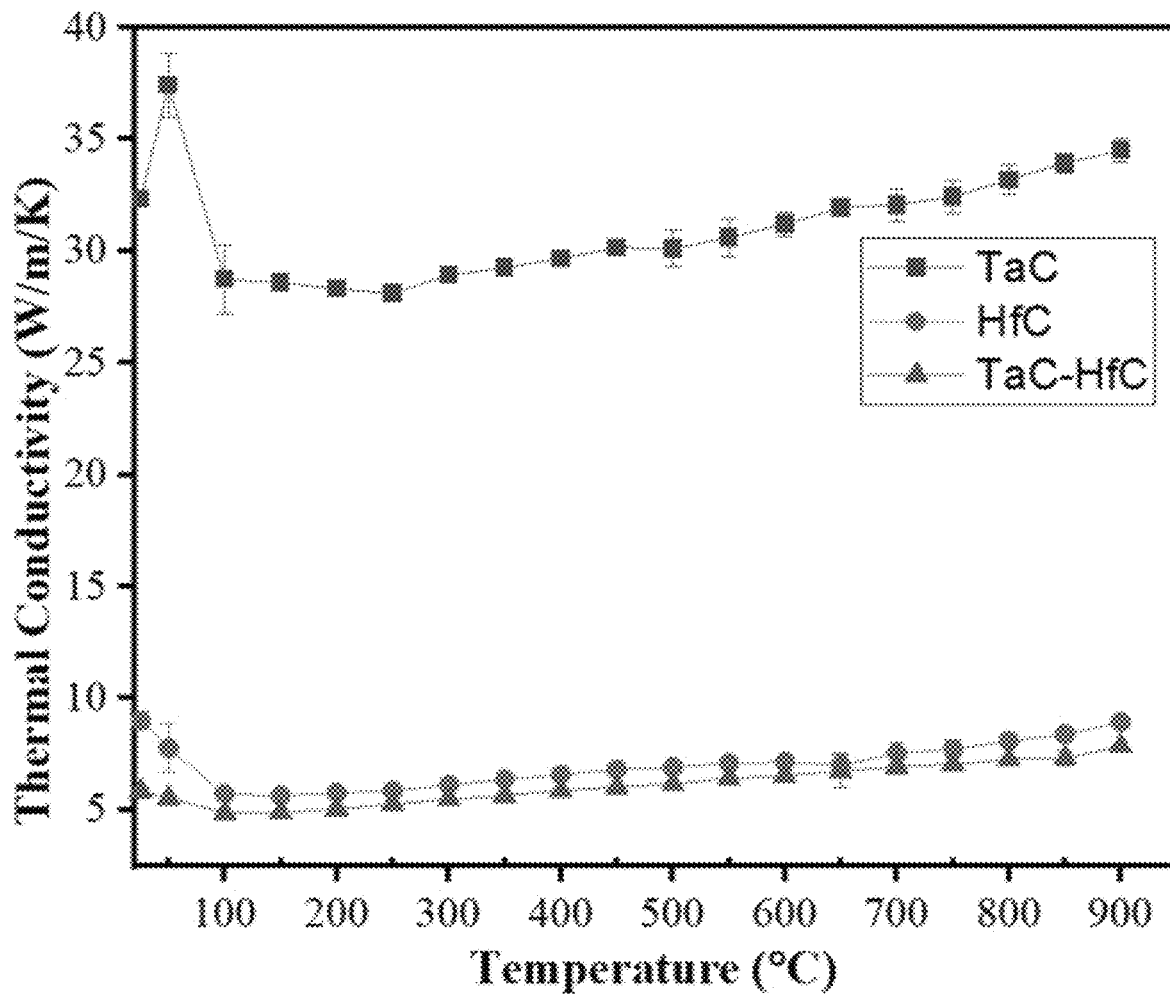
FIG. 15 shows a plot of thermal conductivity (in Watts per meter per Kelvin (W/m-K)) versus temperature (in ° C.) for TaC, HfC, and TaC-HfC UHTC foams. The curve with the highest thermal conductivity values (with the square data points) is for the TaC foam; the curve with the second-highest conductivity values (with the circle data points) is for the HfC foam; and the curve with the lowest conductivity values (with the triangle data points) is for the TaC-HfC foam.

FIG. 15 shows the thermal conductivity of the TaC, HfC, and TaC-HfC foams. Referring to FIG. 15, the 5-fold decrease in the thermal conductivity of TaC-HfC foam as compared to TaC highlights the efficacy of solid-solutioning in providing thermal insulation. The thermal conductivity of HfC foam is similar to that of TaC-HfC foam, but the lower load-bearing capability of HfC foam (cracking marked in FIG. 13) makes TaC-HfC foam better than parent UHTC foams (e.g., TaC and HfC foams).

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An ultra-high temperature carbide (UHTC) foam, comprising first pores having a diameter in a range of from 40 micrometers (μm) to 80 μm, second pores having a diameter in a range of from 10 μm to 30 μm, and third pores having a diameter on the order of hundreds of nanometers (nm), the UHTC foam comprising a porosity of at least 30%, and the UHTC foam comprising tantalum carbide (TaC).

2. The UHTC foam according to claim 1, UHTC foam being a one-component foam comprising TaC.

3. The UHTC foam according to claim 1, further comprising HfC.

4. The UHTC foam according to claim 1, the UHTC foam having a thermal conductivity of less than 60 Watts per meter per Kelvin (W/m-K).

5. The UHTC foam according to claim 1, comprising a solid solution of TaC and HfC.

6. The UHTC foam according to claim 4, the thermal conductivity of the UHTC foam being less than 10 W/m-K.

7. The UHTC foam according to claim 1, the porosity of the UHTC foam being at least 40%.

8. The UHTC foam according to claim 1, the porosity of the UHTC foam being at least 50%.

9. The UHTC foam according to claim 1, the porosity of the UHTC foam being at least 55%.

10. An ultra-high temperature carbide (UHTC) foam, comprising first pores having a diameter in a range of from 40 micrometers (μm) to 80 μm, second pores having a diameter in a range of from 10 μm to 30 μm, and third pores having a diameter on the order of hundreds of nanometers (nm), the UHTC foam having a thermal conductivity of less than 60 Watts per meter per Kelvin (W/m-K), and the UHTC foam comprising tantalum carbide (TaC).

11. The UHTC foam according to claim 10, the UHTC foam being a one-component foam comprising TaC.

12. The UHTC foam according to claim 10, further comprising HfC.

13. The UHTC foam according to claim 10, comprising a solid solution of TaC and HfC.

14. The UHTC foam according to claim 10, the thermal conductivity of the UHTC foam being less than 20 W/m-K.

15. The UHTC foam according to claim 10, the thermal conductivity of the UHTC foam being less than 10 W/m-K.

16. An ultra-high temperature carbide (UHTC) foam, comprising first pores having a diameter in a range of from 40 micrometers (μm) to 80 μm, second pores having a diameter in a range of from 10 μm to 30 μm, and third pores having a diameter on the order of hundreds of nanometers (nm), the UHTC foam comprising a solid solution of TaC and HfC, the UHTC foam comprising a porosity of at least 40%, and the UHTC foam having a thermal conductivity of less than 10 Watts per meter per Kelvin (W/m-K).

* * * * *